United States Patent
Chen et al.

(10) Patent No.: US 10,652,535 B1
(45) Date of Patent: May 12, 2020

(54) MEMORY-EFFICIENT FILTERING APPROACH FOR IMAGE AND VIDEO CODING

(71) Applicant: GOOGLE LLC, Mountain View, CA (US)

(72) Inventors: Cheng Chen, Mountain View, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/287,881

(22) Filed: Feb. 27, 2019

(51) Int. Cl.
*H04N 19/117* (2014.01)
*H04N 19/172* (2014.01)
*H04N 19/426* (2014.01)

(52) U.S. Cl.
CPC ......... *H04N 19/117* (2014.11); *H04N 19/172* (2014.11); *H04N 19/426* (2014.11)

(58) Field of Classification Search
CPC ... H04N 19/117; H04N 19/172; H04N 19/426
See application file for complete search history.

(56) References Cited

U.S. PATENT DOCUMENTS

| | | | | |
|---|---|---|---|---|
| 2006/0140498 A1* | 6/2006 | Kudo | ........................ | G06T 1/60 382/254 |
| 2010/0008599 A1* | 1/2010 | Kawabe | ................. | G06T 3/4007 382/300 |
| 2015/0195533 A1* | 7/2015 | Hsiang | .................. | H04N 19/117 375/240.02 |
| 2015/0334319 A1* | 11/2015 | Ohara | .................... | H04N 5/357 348/241 |
| 2019/0045186 A1* | 2/2019 | Zhang | .................. | H04N 19/117 |

FOREIGN PATENT DOCUMENTS

EP 1895470 A2 3/2008

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
(Continued)

*Primary Examiner* — Tracy Y. Li
(74) *Attorney, Agent, or Firm* — Young Basile Hanlon & MacFarlane, P.C.

(57) ABSTRACT

A memory-efficient filtering approach is used to code images and video. A buffer having a fixed size based on a size of processing units to use for filtering a video frame is allocated. For each of the processing units, pre-filtered pixel values are copied from a respective region of the video frame to the buffer based on a writing point for the video frame and an offset applied to the writing point, filtering is performed against the pre-filtered pixel values from the buffer to produce filtered pixel values, and the filtered pixel values are written to the video frame based on the writing point and the offset. The filtering may be performed using a loop restoration tool, such as where the pre-filtered pixel values are output from a constrained directional enhancement filter (CDEF) tool. Alternatively, the filtering may be performed using the CDEF tool or another coding tool.

20 Claims, 9 Drawing Sheets

(56) References Cited

OTHER PUBLICATIONS

Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion of International Application No. PCT/US2019/059026 dated Jan. 28, 2020; 13 pages.
Naqvi et al; "A low cost multiprocessor architecture for real-time image processing"; IEE Colloquium on digital signal processing, Jan. 1, 1986; pp. 6/1-6/5.
Howard Jay Siegel et al; "Pasm: A partitionable SIMD/MIMD system for image processing and pattern recognition"; IEEE Transactions on Computers, IEEE, USA, vol. C-30. No. 12; Dec. 1, 1981; pp. 934-947.
Haiqian Yu et al; "Optimizing data intensive window-based image processing on reconfigurable hardware boards", Proc. IEEE Workshop on Signal Processing System Design and Implementation, Nov. 2, 2005, pp. 491-496.
Torres-Huitzil C et al: "Real-time image processing with a compact FPGA-based systolic architecture"; Real-Time Imaging, Academic Press Limited, GB, vol. 10, No. 3, Jun. 1, 2004, pp. 177-187.
Dongju Li et al; "Design Optimization of VLSI Array Processor Architecture for Window Image Processing"; IEICE Transactions on Fundamentals of Electronics, Communications and Computer Science, vol. 32, No. 8, Aug. 1, 1999, pp. 1475-1484.

\* cited by examiner

MEMORY-EFFICIENT FILTERING APPROACH FOR IMAGE AND VIDEO CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for filtering a video frame according to an implementation of this disclosure includes allocating a buffer having a fixed size based on a size of processing units to use for filtering the video frame. For each of the processing units, pre-filtered pixel values are copied from a respective region of the video frame to the buffer, filtering is performed against the pre-filtered pixel values from the buffer to produce filtered pixel values, and the filtered pixel values are written to the video frame based on the writing point and based on the offset. The respective region of the video frame is selected based on an offset applied to a writing point for the video frame. The writing point represents a location extended beyond a boundary of the frame. The offset specifies a distance from the writing point based on a number of processing units for which filtering has already been performed. After the filtered pixel values are written to the video frame for each of the processing units, the video frame is output for display or storage.

An apparatus for filtering a video frame according to an implementation of this disclosure includes a memory and a processor. A first portion of the memory is allocated for storing instructions. A second portion of the memory is allocated for a buffer having a fixed size based on a size of processing units to use for filtering the video frame. The processor is configured to execute the instructions. The instructions include instructions to: copy, for a first processing unit, pre-filtered pixel values from a first region of the video frame to the buffer, wherein a start point of the first processing unit corresponds to a writing point defined for the video frame; perform filtering against the buffered pre-filtered pixel values of the first processing unit to produce first filtered pixel values; write the first filtered pixel values to the video frame; copy, for a second processing unit, pre-filtered pixel values from a second region of the video frame to the buffer, wherein a start point of the second processing unit corresponds to an offset applied to the writing point; perform filtering against the buffered pre-filtered pixel values of the second processing unit to produce second filtered pixel values; write the second filtered pixel values to the video frame; and, after writing filtered pixel values for all processing units, output the video frame for display or storage.

An encoder according to an implementation of this disclosure performs operations for filtering a video frame, including identifying a writing point for the video frame by shifting a start point of the video frame by a number of pixels, in which the start point of the video frame represents a top-left-most position of the video frame. Pre-filtered pixel values for a processing unit are copied from a region of the video frame to a buffer having a fixed size based on a size of the processing unit, in which a position of the writing point represents a top-left-most position of the processing unit. Filtering is performed against the pre-filtered pixel values from the buffer to produce filtered pixel values of the processing unit. The filtered pixel values of the processing unit are written to the video frame based on the writing point.

A decoder according to an implementation of this disclosure performs operations for filtering a video frame, including identifying a writing point for the video frame by shifting a start point of the video frame by a number of pixels, in which the start point of the video frame represents a top-left-most position of the video frame. Pre-filtered pixel values for a processing unit are copied from a region of the video frame to a buffer having a fixed size based on a size of the processing unit, in which a position of the writing point represents a top-left-most position of the processing unit. Filtering is performed against the pre-filtered pixel values from the buffer to produce filtered pixel values of the processing unit. The filtered pixel values of the processing unit are written to the video frame based on the writing point.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
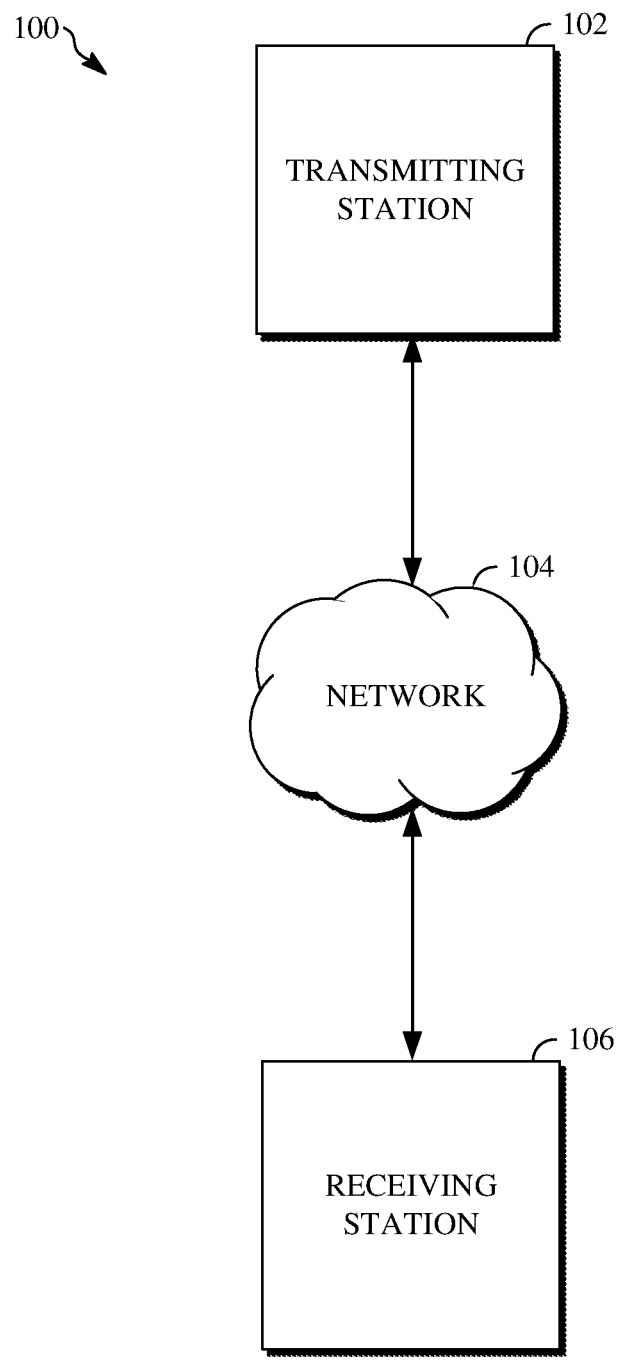
FIG. 1 is a schematic of an example of a video encoding and decoding system.

Video compression schemes may include breaking respective images, or frames, of an input video stream into smaller portions, such as blocks, and generating a bitstream using techniques to limit the information included for respective blocks in the output. The compressed bitstream can be decoded to re-create the source images from the limited information. Video compression techniques performed by typical encoders include degrading an input video stream to reduce the data size when encoded to a bitstream. For example, lossy operations performed during the prediction, transform, and/or quantization stages of an encoder may remove certain video data from the input video stream, while preserving other video data which is later used by a decoder to reconstruct the compressed bitstream into an output video stream. Those lossy operations can result in undesirable blocking artifacts being introduced within encoded frames.

The encoder and decoder may also perform operations for filtering a video frame, such as after the video frame is reconstructed (e.g., within the reconstruction loop at the encoder or prior the outputting at the decoder). For example, the filtering may be performed to process a reconstructed video frame for use as a reference frame. The reference frame may then be used for predicting subsequent video frames of the input video stream or the bitstream. Depending on the particular codec used to encode and decode the video frame, the filtering can be performed using one of a number of different tools. For example, in the AV1 codec, the filtering can be performed using the loop restoration tool.

Loop restoration includes dividing a video frame into processing units. A processing unit is a square-shaped segment of the video frame of size 64×64, 128×128, or 256× 256. However, a processing unit may instead be of a different shape and/or of a different size, subject to the capabilities of the codec that performs the loop restoration. A filtering technique is used during loop restoration to restore video data degraded from within some or all of the processing units. The filtering techniques available for loop restoration tool may include a Wiener filter (e.g., a separable symmetric normalized Wiener filter), a self-guided filter (e.g., a dual self-guided filter), or another filter.

However, a filtering technique performed using a loop restoration tool or another tool available to an encoder or a decoder typically uses a large amount of computing resources, such as memory. For example, in typical loop restoration approaches, processing units often overlap within a video frame, resulting in some pixels within the video frame being processed using multiple processing units. Given that each processing unit is used to perform filtering against pre-filtered pixel values, rather than already filtered pixel values, the overlapping regions of the video frame introduce a potential processing conflict.

Typical loop restoration approaches address this conflict by copying the pre-filtered video frame into an additional video frame buffer. After the entire video frame has been filtered, it is written from the additional video frame buffer, such as for display or storage. However, the allocating of an extra buffer for storing the entire video frame is an inefficient use of memory resources since the encoder or decoder is essentially required to maintain two complete copies of the video data for the video frame.

Implementations of this disclosure address problems such as these using a memory-efficient filtering approach to code images and video. A buffer having a fixed size based on a size of processing units to use for filtering a video frame is allocated. For each of the processing units, pre-filtered pixel values are copied from a respective region of the video frame to the buffer based on a writing point for the video frame and an offset applied to the writing point, filtering is performed against the pre-filtered pixel values from the buffer to produce filtered pixel values, and the filtered pixel values are written to the video frame based on the writing point and the offset.

The filtering may be performed using a loop restoration tool, such as where the pre-filtered pixel values are output from a constrained directional enhancement filter (CDEF) tool. Alternatively, the filtering may be performed using the CDEF tool or another coding tool. Thus, the memory-efficient filtering approach disclosed herein may represent operations performed at a filtering stage of an image or video coding process. As such, the memory-efficient filtering approach disclosed herein may be used in the encoding and/or decoding process for image and/or video data.

The fixed size buffer and writing point offset introduced by the implementations of this disclosure improve the encoding and decoding performance for image and video, and therefore introduce improvements to image and video coding technology. In particular, using the fixed size buffer and the writing point offset reduces the additional memory resource usage by a filtering tool to that of a single processing unit, rather than an entire video frame. Further, using the writing point offset to indicate locations of the processing units reduces or prevents the occurrence of processing units overlapping one another in the video frame.

Further details of techniques for a memory-efficient filtering approach for image and video coding are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
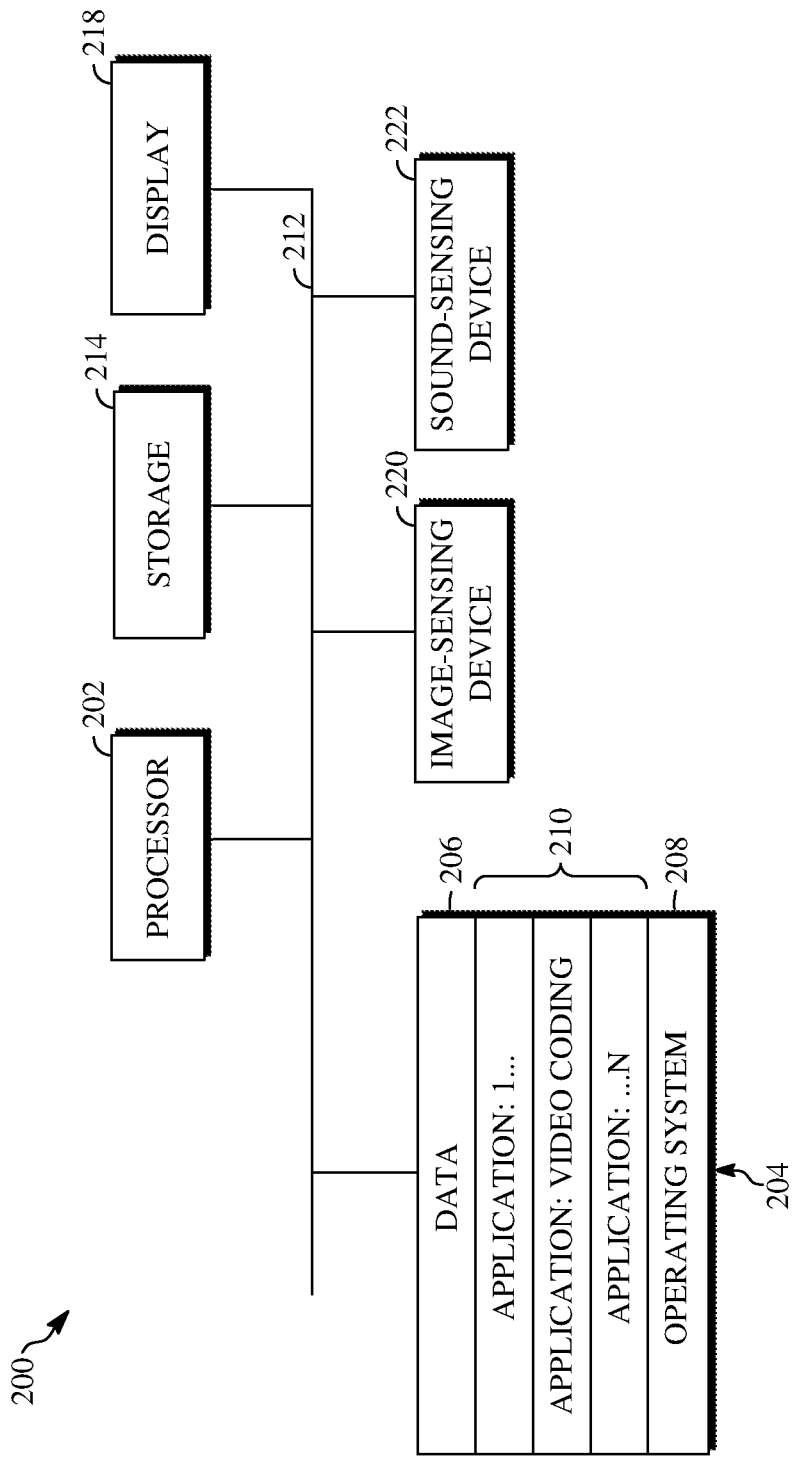
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video and/or image coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
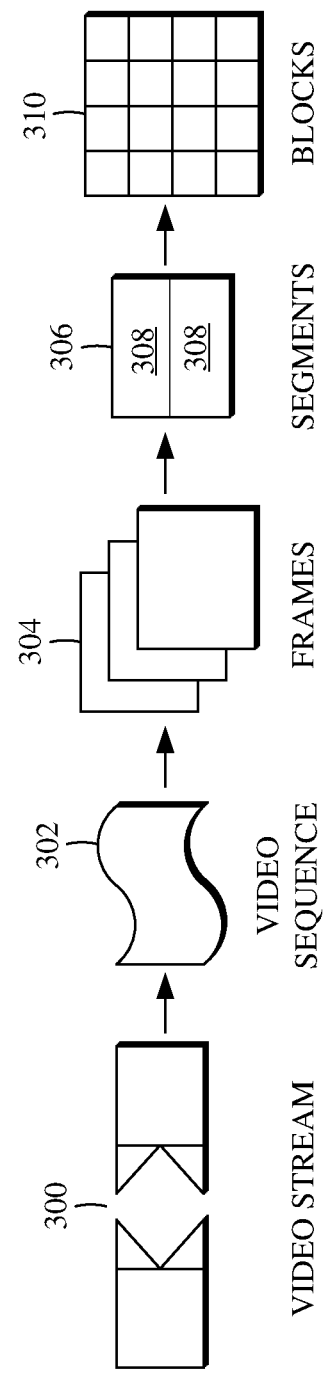
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
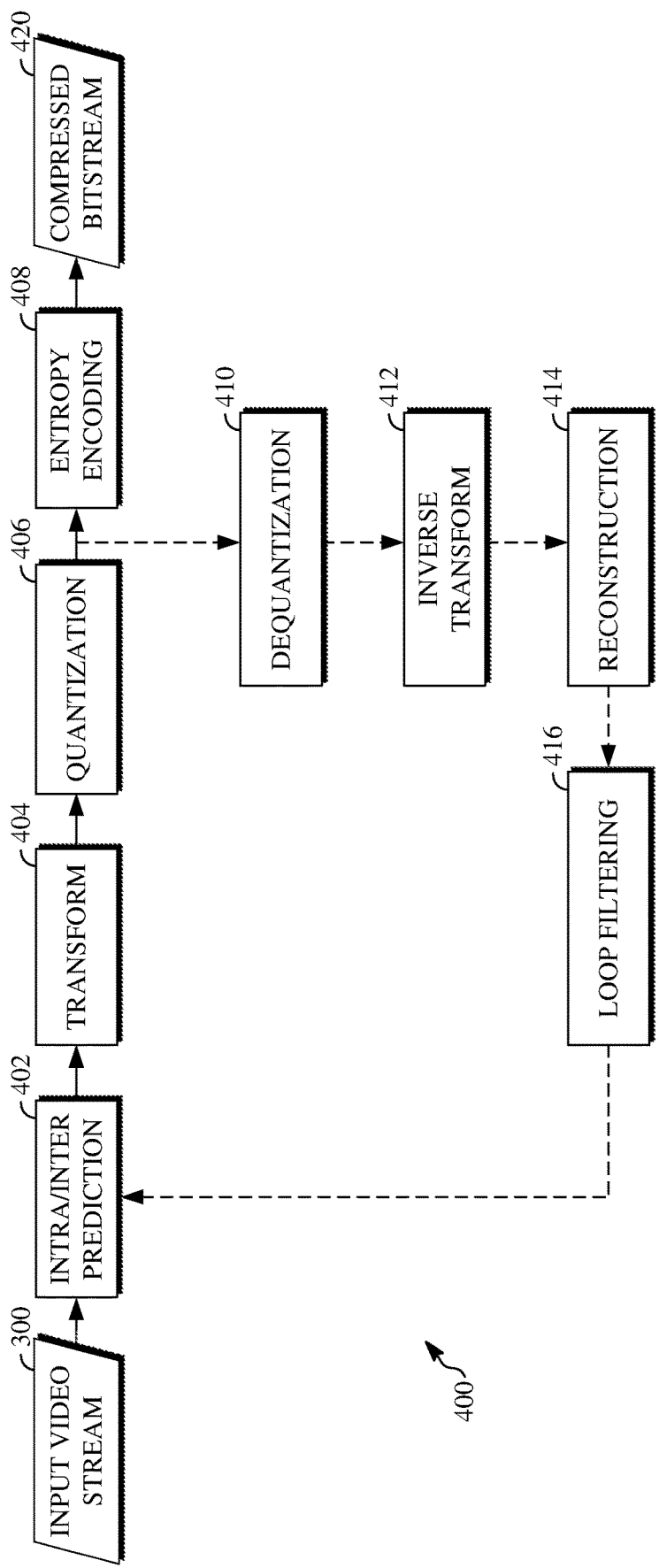
FIG. 4 is a block diagram of an example of an encoder according to implementations of this disclosure.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation: a deblocking filter as in AVC, VP9, HEVC, and AV1; a CDEF as in AV1; a super resolution filter as in AV1; and a loop restoration filter as in AV1.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
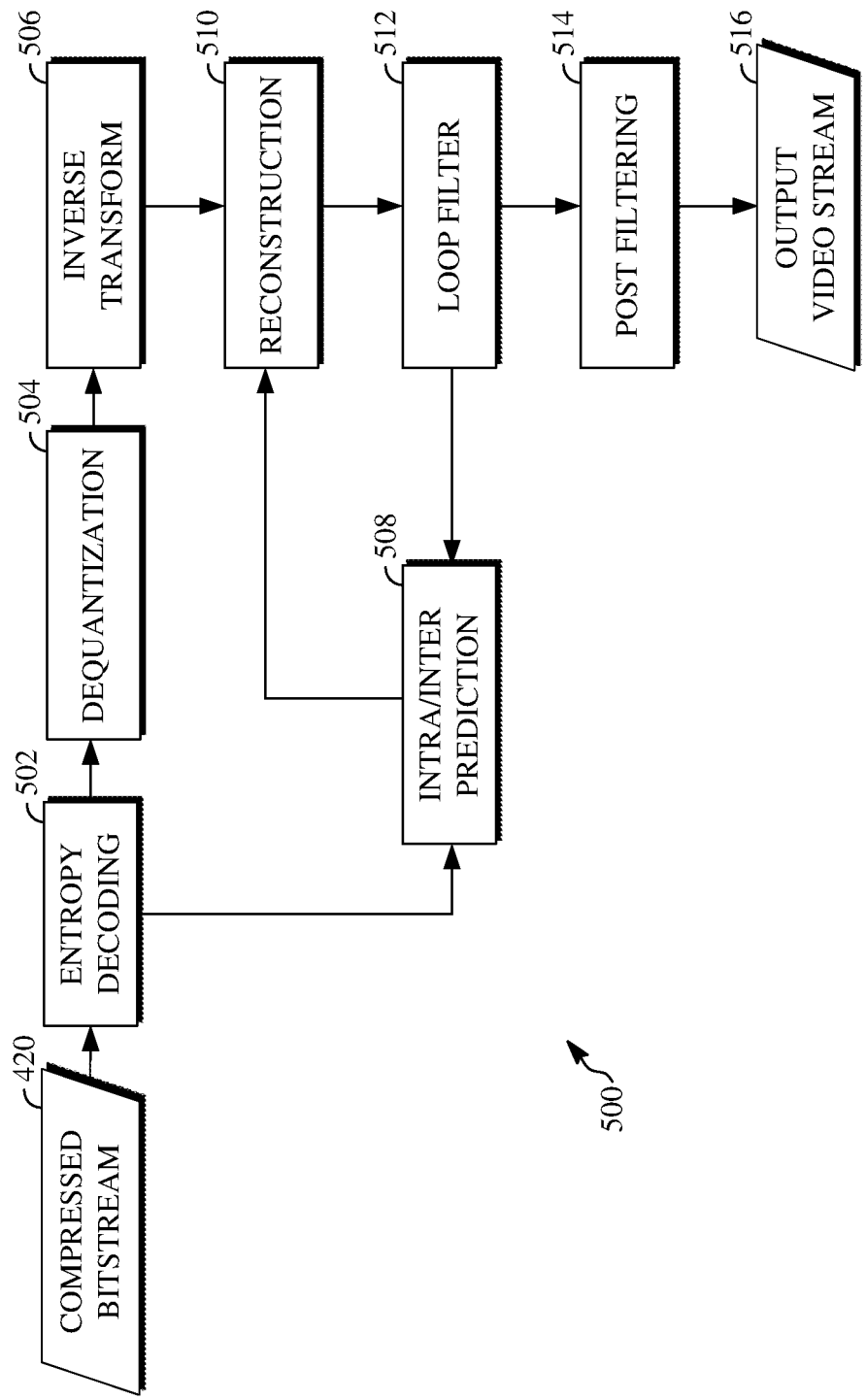
FIG. 5 is a block diagram of an example of a decoder according to implementations of this disclosure.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can apply an in-loop filter or other filter to the reconstructed block to reduce distortion such as blocking artifacts. Examples of filters which may be applied at the loop filtering stage 512 include, without limitation: a deblocking filter as in AVC, VP9, HEVC, and AV1; a CDEF as in AV1; a super resolution filter as in AV1; and a loop restoration filter as in AV1.

Other filtering can also be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514.

Figure 6:
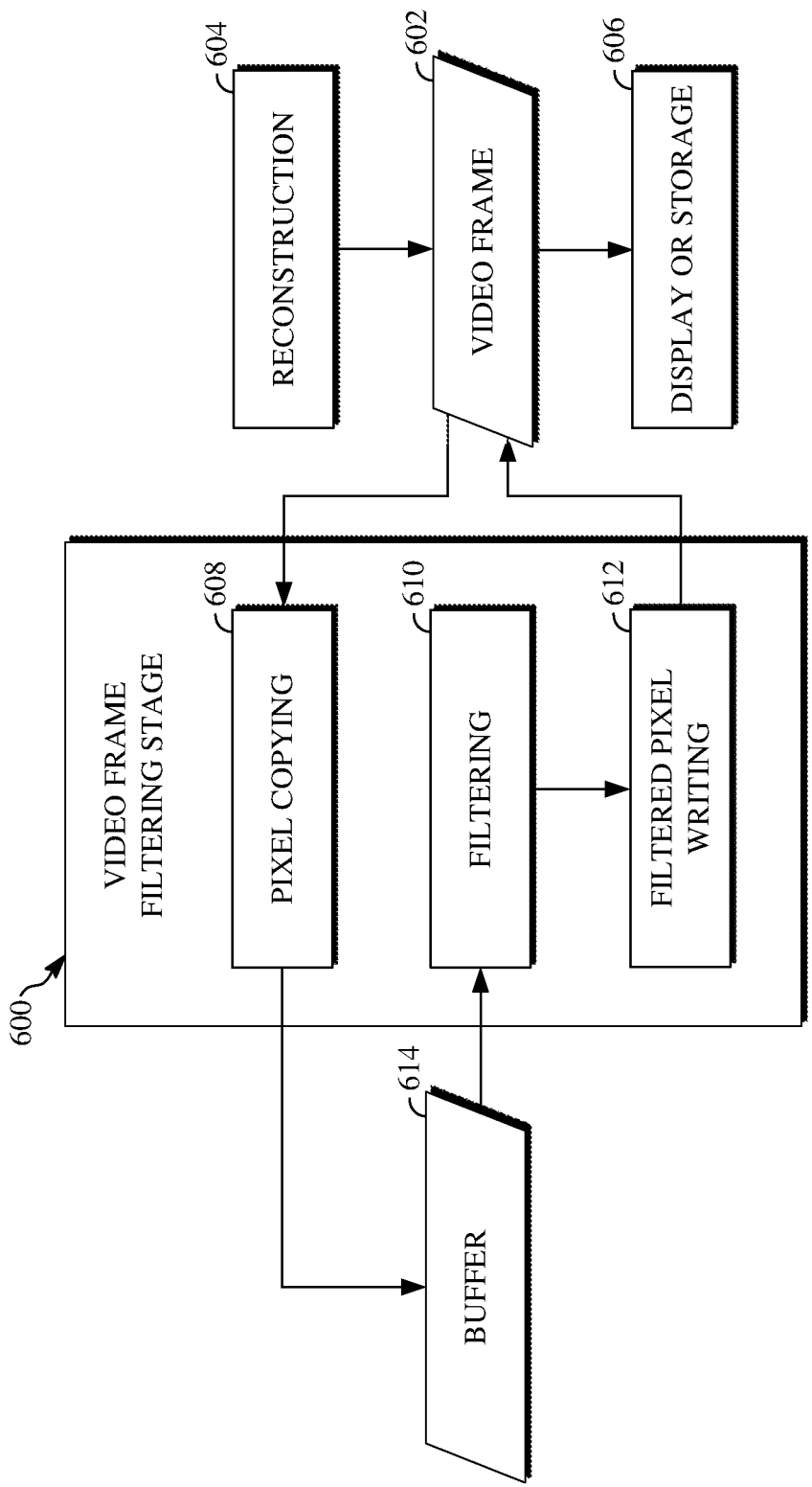
FIG. 6 is a block diagram of an example of a video frame filtering stage according to implementations of this disclosure.

FIG. 6 is a block diagram of an example of a video frame filtering stage 600 according to implementations of this disclosure. The video frame filtering stage 600 performs filtering against a video frame 602 to prepare the video frame 602 for display or storage. During encoding, the video frame filtering stage 600 may be the loop filtering stage 416 of the encoder 400 shown in FIG. 4 or a stage that performs some, but not all, of the operations performed at the loop filtering stage 416. During decoding, the video frame filtering stage 600 may be the loop filtering stage 512 of the decoder 500 shown in FIG. 5 or a stage that performs some, but not all, of the operations performed at the loop filtering stage 512. Thus, the video frame filtering stage 600 may represent, for example, functionality of a loop restoration tool of an encoder or of a decoder, functionality of a CDEF tool of an encoder or of a decoder, or functionality of another filtering tool of an encoder or of a decoder.

The video frame 602 is a video frame output from a reconstruction stage 604. For example, the reconstruction stage 604 may be the reconstruction stage 414 of the encoder 400 or the reconstruction stage 604 may be the reconstruction stage 510 shown of the decoder 500. After the filtering at the video frame filtering stage 600, the video frame 602 is sent as output for display or storage 606. The display or storage 606 may represent operations for storing the filtered video frame 602 in a reference frame buffer of the encoder 400 or of the decoder 500. Alternatively, the display or storage 606 may represent operations for outputting the filtered video frame 602 within an output video stream for display at a device that receives the output video stream.

The video frame filtering stage 600 receives the video frame 602 after the video frame is output from the reconstruction stage 604 and prepares the video frame 602 for sending as output for the display or storage 606. The video frame filtering stage 600 includes a pixel copying stage 608, a filtering stage 610, and a filtered pixel writing stage 612. The video frame filtering stage 600 uses a buffer 614 to store portions of the video frame 602 to be filtered.

The video frame filtering stage 600 uses processing units to process individual regions of the video frame 602 one at a time. As previously stated, a processing unit is a coding structure of size M×N, where M and N may be the same or different numbers. The size of the processing units may be based on the size of the largest block within the video frame 602. For example, if the largest block within the video frame 602 is 128×128, the processing units used by the video frame filtering stage 600 may be of size 128×128 or larger.

The processing units are typically square in shape. However, as the processing units may be of size M×N, the processing units may be square or rectangular in shape. The processing units are typically all of the same size and shape. However, in some cases, the processing units may be variably sized and/or variably shaped. For example, a variable size and/or variable shape processing unit partitioning scheme can be used to divide the video frame 602 into a plurality of processing units.

Each of the processing units includes pixel values from a region of the video frame 602. Each of the pixel values of the video frame is included in a single processing unit. As such, the video frame filtering stage 600 filters each of the pixel values of the video frame 602 by processing each of the processing units. The video frame filtering stage 600 sequentially processes the processing units one at a time. The order for processing the processing units at the video frame filtering stage 600 may depend upon a scan order or other order for the encoding or decoding of the video frame 602. For example, where a raster order is used, the video frame filtering stage 600 first processes a processing unit that includes top-left-most pixel values of the video frame 602.

For each of the processing units, the video frame filtering stage 600 performs operations starting at the pixel copying stage 608, then at the filtering stage 610, and ending at the filtered pixel writing stage 612. First, the pixel copying stage 608 copies pre-filtered pixel values from the region of the video frame 602 corresponding to a current processing unit into the buffer 614. Next, the filtering stage 610 performs filtering against the pre-filtered pixel values within the buffer 614 to produce filtered pixel values. Finally, the filtered pixel writing stage 612 writes the filtered pixel values back to the region of the video frame 702 from which the corresponding pre-filtered pixel values were copied.

The particular technique for the filtering performed against the pre-filtered pixel values at the filtering stage 610 is based on the filtering tool or filtering tools used to perform the filtering. For example, where the filtering at the filtering stage 610 is performed using a loop restoration tool of an encoder (e.g., the encoder 400) or of a decoder (e.g., the decoder 500), the filtering stage 610 can use one or more filtering techniques to restore video data previously degraded from the video frame 602.

For example, filtering techniques which may be used to restore video data previously degraded from the video frame 602 may include a Wiener filter (e.g., a separable symmetric normalized Wiener filter), a dual self-guided filter, another filter, or a combination thereof. The Wiener filter may be an M×N filter (where M and N may be the same or different numbers) for which parameters for each horizontal and vertical filter are signaled (e.g., within a bitstream). The dual self-guided filter may be an M×N filter (where M and N may be the same or different numbers) for which noise parameters are signaled and in which the output of one or more such filters are weighted.

The filtering stage 610 is not limited to performing filtering using a loop restoration tool. In some implementations, the filtering stage 610 may perform filtering using a CDEF tool of an encoder or of a decoder. In some implementations, another filtering tool used for encoding or decoding may be used by the filtering stage 610 to perform the filtering against the pre-filtered pixel values for the respective processing units.

The buffer 614 is allocated to have a fixed size based on the size of the processing units used for performing filtering at the filtering stage 610. In particular, the size of the buffer 614 is based on an extended region of the processing units. The extended region of a processing unit refers to the processing unit and a number of pixels extended from the boundary of the processing unit on one or more sides of the processing unit. As such, the extended region, and therefore the fixed size of the buffer, is based on the filtering technique performed at the filtering stage 610.

The extended region of the processing units is introduced for use at the filtering stage 610. Certain filtering techniques which may be performed at the filtering stage 610 may require or otherwise use a number which pixels beyond the processing unit size. Thus, the extended region of a processing unit accommodates the size requirement for a filtering technique.

In some implementations, a Wiener filter may require an extension of 3 pixels on each side of the processing unit. As such, where the processing units are of size 64×64 and the filtering stage 610 performs loop restoration using a Wiener filter, the size of the buffer 614 is fixed to store data for a 67×67 region of the video frame 602. In some implementations, a self-guided filter may require an extension of 1 pixel on each side of the processing unit. As such, where the processing units are of size 64×64 and the filtering stage 610 performs loop restoration using a self-guided filter, the size of the buffer 614 is fixed to store data for a 65×65 region of the video frame 602.

An extended frame boundary is used to enable the extended regions of the processing units. The extended frame boundary is a boundary which surrounds the video frame 602 and which includes a number of pixels extended from the boundary of the video frame 602. Thus, the extended frame boundary represents a size of the video frame 602 in which a number of pixels is extended from each side of the boundary of the video frame 602.

The size of the extended frame boundary is based on a resolution of the video frame 602. The extended frame boundary is used to align the video frame 602 with other video frames of the input video stream or bitstream, as applicable, based on the resolution indicated for displaying the video frame 602 and those other video frames. For example, each resolution (e.g., 720p, 1080p, 2K, 4K, or other resolutions) may use a particular frame size for displaying the video frames. In the event the size of the video frame 602 during encoding or decoding is not the particular frame size for the resolution at which to display the video frame 602, the extended frame boundary is introduced to change the effective size of the video frame 602 to the particular frame size for the resolution.

The video frame 602 and the other video frames in the same input video stream or bitstream are aligned by half of the size of those video frames. For example, if the size of those video frames corresponds to the 4K resolution, the alignment is based on the size for the 2K resolution. Typically, each video frame in an input video stream or bitstream have the same alignment since they are set for display at the same resolution. However, in some cases, some of the video frames may have different alignments. For example, in cases where a user of a video streaming platform selects to change a resolution of a video stream while the video is streaming, video frames displayed after the change in resolution will likely be aligned differently than video frames displayed prior to the change in resolution.

In at least some cases, the alignment may correspond with a largest pixel extension required or used by the filtering techniques performed at the filtering stage 610. For example, if the largest pixel extension for the filtering techniques is 3 pixels, the alignment may also be by 3 pixels to support each possible filtering technique used at the filtering stage 610.

Figure 7:
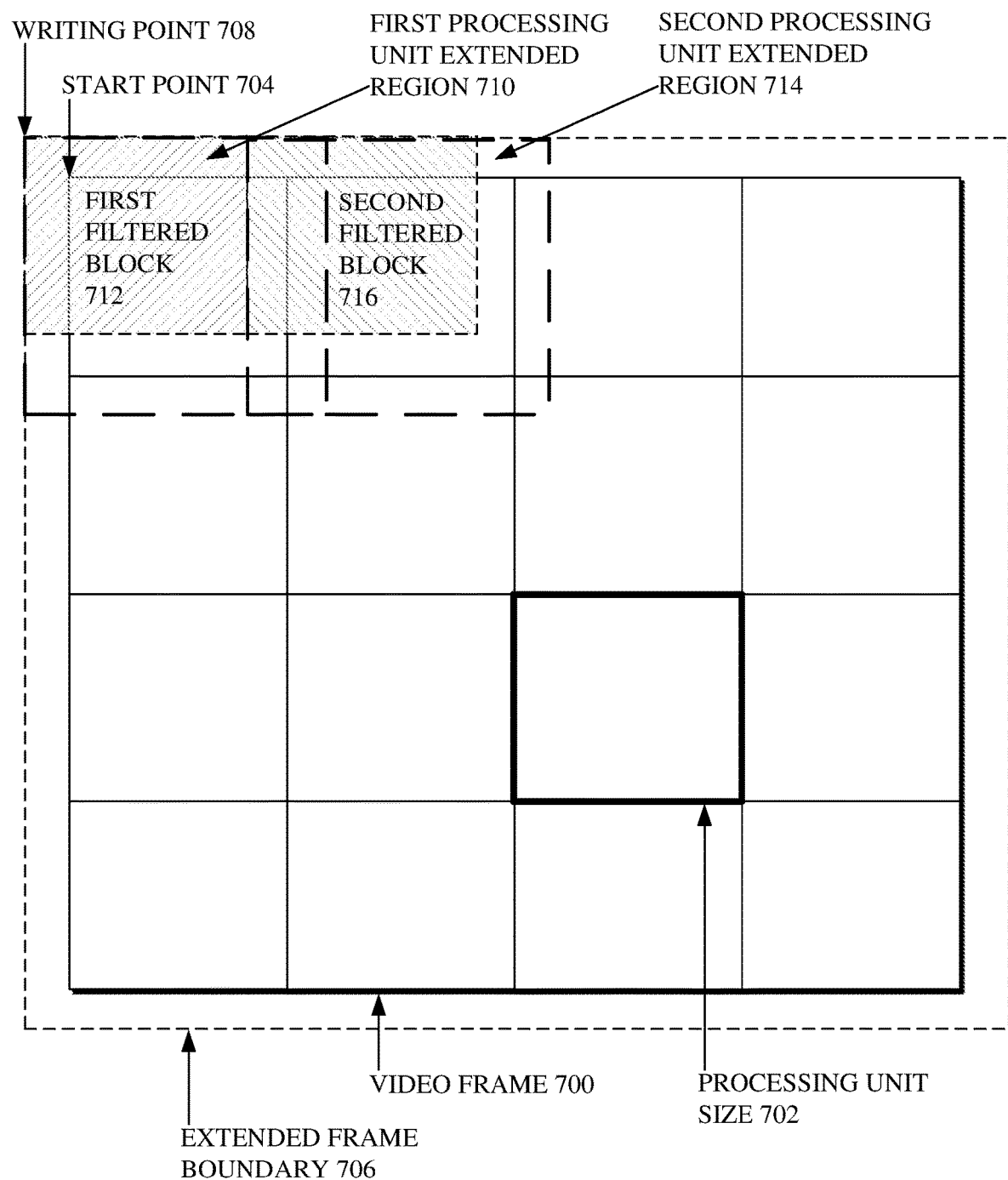
FIG. 7 is an illustration of an example of processing units used to filter a video frame.

The extended frame boundary defines the locations of the regions to which processing unit for the video frame 602 correspond. To illustrate this, reference is now made to FIG. 7. FIG. 7 is an illustration of an example of processing units used to filter a video frame 700, which may, for example, be the video frame 602 shown in FIG. 6. As shown, the video frame 700 is separated into 16 regions of equal size. Each of those regions includes a number of pixel values, and each of those regions corresponds to one processing unit. For reference, a size of such a processing unit is shown at 702. Examples throughout the description of FIG. 7 refer to the processing unit size shown at 702 as being 64×64; however, other processing unit sizes can be used for filtering the video frame 700.

A start point 704 of the video frame 700 indicates a location of a first pixel to filter (e.g., using a loop restoration tool, a CDEF tool, or another filter tool). Where the filtering follows the raster order, the start point 704 is the top-left-most pixel of the video frame 700, such as is shown in FIG. 7. Alternatively, where the filtering follows an order that does not begin at the top-left of the video frame 700, the start point 704 may be located elsewhere about the video frame 700.

An extended frame boundary 706 surrounds the video frame 700 and an additional number of pixels extended on one or more sides of the video frame 700. As shown in FIG. 7, the extended frame boundary 706 includes additional pixels extended on all four sides of the video frame 700. The extended frame boundary 706 also defines a writing point 708 that accounts for the alignment of the video frame 700. The writing point 708 indicates a starting location for an extended region of a first processing unit 710. As shown in FIG. 7, the writing point 708 is located at a top-left-most position of the extended frame boundary 706. Thus, the writing point 708 represents a location extended beyond the original boundary of the video frame 700.

Whereas the size of the first processing unit is 64×64 (i.e., the processing unit size shown at 702), the size of the extended region of the first processing unit 710 is 64+M× 64+N, where M and N represent the extended region of the processing unit based on the resolution for displaying the video frame 700, the requirements of the filtering technique to be used for filtering the video frame, or both. For example, the extended region of the first processing unit 710 can be 64+3×64+3, or 67×67.

The first processing unit is used for filtering a region of the video frame 700 starting at the start point 704. For example, the pixel locations throughout the video frame 700 can be considered as a two-dimensional grid, such as with X- and Y-axes. Where the extended frame boundary 706 extends the size of the video frame 700 by 3 pixels on each side, the writing point 708 would be located at (−3, −3). The extended region of the first processing unit 710 extends from (0−3, 0−3) to (64+3, 64+3), or (−3, −3) to (67, 67). The start point 704 would be located at (0, 0) such that the first region filtered for the first processing unit starts at (0, 0). That first region is of the same size as the first processing unit and therefore extends from (0, 0) to (64, 64).

That first region corresponding to the first processing unit is shown after filtering as a first filtered block 712. Whereas the pixel values for that first region are pre-filtered pixel values before the filtering, the pixel values after the filtering are filtered pixel values. After being filtered, pixel values of the video frame 700 are shifted towards the writing point 708. For example, the pre-filtered pixel values for that first region were located in the video frame 700 starting at the start point 704; however, the filtered pixel values of the first filtered block 712 are shifted and written to the video frame 700 at the writing point 708.

An extended region of a second processing unit 714 is shown next to the extended region of the first processing unit

710. After the first filtered block 712 is written to the video frame 700, the second processing unit is used for filtering a next region of the video frame 700. The location of a next region of the video frame 700 corresponding to the next (e.g., the second) processing unit is indicated based on an offset applied to the writing point 708.

The offset specifies a distance from the writing point 708 based on a number of processing units for which filtering has already been performed. Here, since filtering has already been performed for one processing unit, the offset applied to the writing point 708 indicates to start the second processing unit based on where the first filtered block 712 ended within the video frame 700. Thus, the offset for the second processing unit indicates that the second processing unit starts at a location that is 64+3, or 67, pixels from the writing point 708. Referring back to the two-dimensional grid described above, the second processing unit would extend from (64, 0) to (128, 64), and the extended region of the second processing unit 714 would extend from (64−3, 0−3) to (128+3, 64+3), or (61, −3) to (131, 67).

The region corresponding to the second processing unit is shown after filtering as the second filtered block 716. Similar to how the filtered pixel values of the first filtered block 712 were shifted towards the writing point 708, the filtered pixel values of the second filtered block 716 are shifted and written to the video frame 700 following the first filtered block 712. The location at which to write the filtered pixel values of the second filtered block 716 can be determined based on the offset applied to the writing point 708. For example, the offset can indicate that the second filtered block 716 is to be written to the video frame 700 at a location that is 67−3, or 64 pixels, from the writing point 708.

After the second filtered block 716 is written, an offset to apply to the writing point 708 for a third processing unit is determined. Here, since filtering has already been performed for two processing units, the offset applied to the writing point 708 would indicate to start the third processing unit based on where the second filtered block 716 ended within the video frame 700.

Thus, the offset for the third processing unit would indicate that the third processing unit starts at a position that is 128+3, or 131, pixels from the writing point 708. Referring back to the two-dimensional grid described above, the third processing unit would extend from (128, 0) to (192, 64), and the extended region of the third processing unit (not shown) would extend from (128−3, 0−3) to (192+3, 64+3), or (125, −3) to (195, 67).

The processing units illustrated in FIG. 7 are particularly shown by example to be processing units used for loop restoration of the video frame 700. However, other variations of the processing units may be used. For example, processing units used for filtering by a CDEF tool may have a different form or structure than what is shown in FIG. 7.

Referring back to FIG. 6, for a first processing unit, the pixel copying stage 608 copies pre-filtered pixel values from the video frame 602 to the buffer 614 starting at the start point of the video frame 602. The buffered pre-filtered pixel values are then filtered at the filtering stage 610, for example, based an extended region of the first processing unit, the location of which is determined based on an offset applied to a writing point for the video frame 602 (e.g., the offset being 0 here, since no processing units have already been processed).

The filtered pixel values output from the filtering stage 610 are then written at the filtered pixel writing stage 612 to the video frame 602. The location within the video frame 602 at which the filtered pixel values for the first processing unit are written is determined based on a shift towards the writing point from the starting location of the processing unit (e.g., the starting location being the start point of the video frame 602 here, since no processing units have already been processed). In particular, since this is the first processing unit, the filtered pixel writing stage 612 writes the filtered pixel values to the video frame 602 starting at the writing point.

Next, for a second processing unit, the pixel copying stage 608 copies pre-filtered pixel values from the video frame 602 to the buffer 614 starting at a location defined by an offset applied to the writing point. Copying the second set of pre-filtered pixel values to the buffer 614 can include first clearing the buffer 614 to make space for the second set of pre-filtered pixel values. Alternatively, copying the second set of pre-filtered pixel values to the buffer 614 can include overwriting the prior video data stored in the buffer 614.

The offset defining the location at which the start copying the pre-filtered pixel values for the second processing unit specifies a distance from the writing point and is based on a number of processing units for which filtering has already been performed. Here, since filtering has already been performed for one processing unit, the offset is equal to the size of the first processing unit in one dimension (e.g., the horizontal direction) plus a difference between the start point and the writing point along the same dimension.

The newly buffered pre-filtered pixel values are filtered at the filtering stage 610 and then written back to the video frame 602 at the filtered pixel writing stage 612. The location within the video frame 602 at which the filtered pixel values for the second processing unit are written is determined based on a shift towards the writing point from the starting location of the processing unit. For example, the shift towards the writing point can be based on a difference between the start point and the writing point in two dimensions. For example, referring to a two-dimensional grid in which the start point of the frame is located at (0, 0) and the writing point is located at (−M, −N), the filtered pixel values for the second processing unit are written to a location in the video frame 602 that is (−M, −N) from the offset applied to the writing point.

This process is repeated for the remaining processing units until each of the pixel values of the video frame 602 have been processed at the video frame filtering stage 600, regardless of whether those pixel values are changed by such processing. After a last processing unit is processed, the video frame 602 is output for display or storage 606.

The same writing point is typically used for each video frame of an input video stream or bitstream. However, in some cases, different video frames of an input video stream or bitstream may use a different writing point. In some implementations, where the resolution of the video stream is changed while the streaming is in progress, the writing point for video frames displayed after the change in resolution may be different from the writing point for video frames displayed prior to the change in resolution. In some implementations, an encoder can support changing the writing point between video frames using information signaled within the bitstream to indicate how to align the video frames, such as based on different resolutions for displaying the video.

Other variations of the video frame 602, the video frame filtering stage 600, and/or other aspects shown in FIG. 6 are possible. In some implementations, the video frame 602 may be a video frame buffer, such as a reference frame buffer or other buffer to which video frames are stored for further use in an encoding or decoding process. For example, the reconstruction stage 604 can store a video frame into the video frame buffer. The video frame filtering stage 600 can then copy pixels of the video frame from the video frame buffer and subsequently write filtered pixels of the video frame back to the video frame buffer. In such an implementation, the display or storage 606 may include operations for finalizing the filtered video frame as a reference frame within the video frame buffer. Alternatively, in such an implementation, the display or storage 606 may be omitted.

In some implementations, the video frame filtering stage 600 may simultaneously process more than one region of the video frame 602. For example, two or more processing units can be processed simultaneously to filter two or more respective regions of the video frame 602. In some implementations, the buffer 614 may include two or more memory allocations for storing pre-filtered pixel values from respective two or more processing units. In some implementations, the buffer 614 may be one of a plurality of buffers that are each allocated for storing one of the two or more processing units. The filtering performed at the filtering stage 610 may be performed in parallel for each of the two or more processing units, such as using multi-threaded processing.

In some implementations, the size of the processing units used by the video frame filtering stage 600 may not be based on the size of the largest block within the video frame 602. In some implementations, the size of the processing units may be based on a configuration of the encoder or decoder that uses the video frame filtering stage 600. In some implementations, the size of the processing units may be based on a non-block partition of the video frame 602. In some implementations, the size of the processing units may be less than the size of the largest block within the video frame 602. In some implementations, the processing units can have different sizes and/or shapes from one another.

In some implementations, the size of the extended frame boundary is based on the filtering technique performed at the filtering stage 610 rather than the resolution of the video frame 602. some implementations, where the video frame is of size M×N and the filtering stage 610 performs loop restoration using a Wiener filter, the extended frame boundary surrounds a M+3×N+3 region about the video frame 602. some implementations, where the video frame is of size M×N and the filtering stage 610 performs loop restoration using a self-guided filter, the extended frame boundary surrounds a M+1×N+1 region about the video frame 602.

Figure 8:
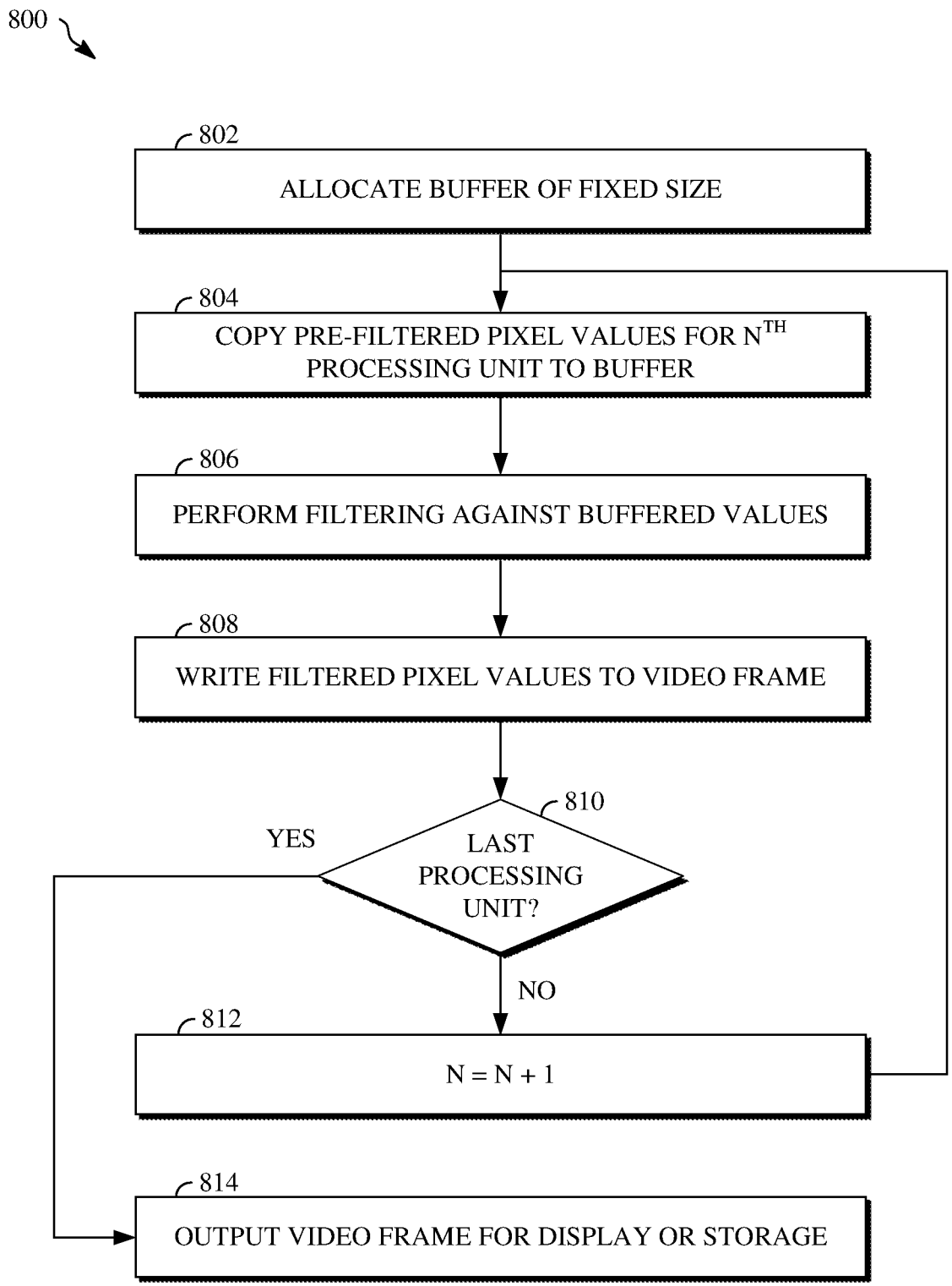
FIG. 8 is a flowchart diagram of an example of a technique for filtering performed using processing units for a video frame and a buffer allocated for the processing units.
Figure 9:
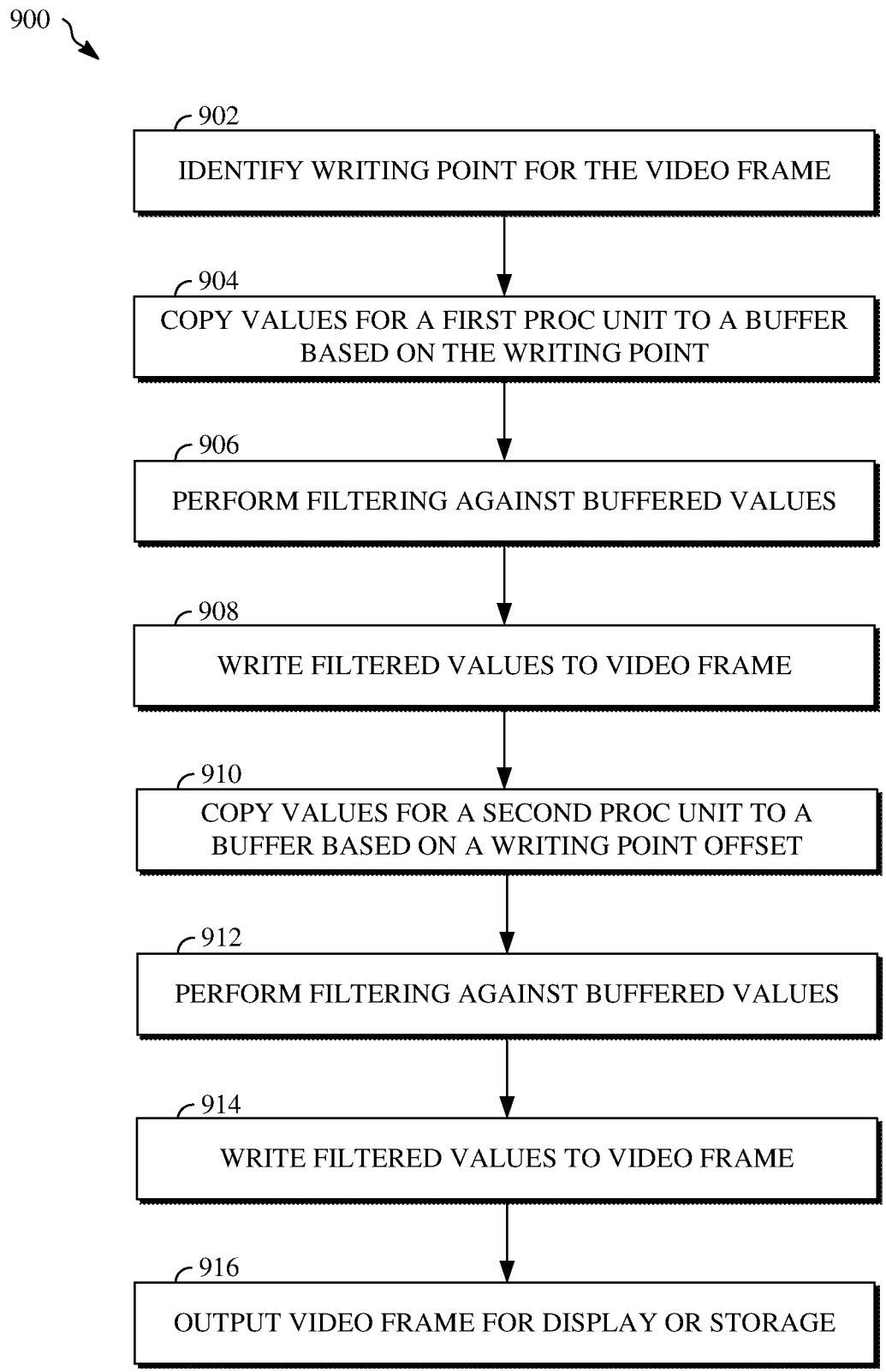
FIG. 9 is a flowchart diagram of an example of a technique for copying and writing pixel values based on a writing point for a video frame.

Further details of techniques for a memory-efficient filtering approach for image and video coding are now described. FIG. 8 is a flowchart diagram of an example of a technique 800 for filtering performed using processing units for a video frame and a buffer allocated for the processing units. FIG. 9 is a flowchart diagram of an example of a technique 900 for copying and writing pixel values based on a writing point for a video frame.

The technique 800 and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800 and/or the technique 900. The technique 800 and/or the technique 900 can be implemented using specialized hardware or firmware. For example, a hardware component configured to perform the technique 800 and/or the technique 900. As explained above, some computing devices may have multiple memories or processors, and the operations described in the technique 800 and/or the technique 900 can be distributed using multiple processors, memories, or both.

For simplicity of explanation, the technique 800 and the technique 900 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for filtering performed using processing units for a video frame and a buffer allocated for the processing units is shown. At 802, a buffer of a fixed size is allocated. Allocating the buffer includes creating or identifying free space in memory for storing video data corresponding to the fixed size. The fixed size of the buffer is based on an extended region of the processing units. The extended region of a processing unit refers to the processing unit and a number of pixels extended from the boundary of the processing unit on one or more sides of the processing unit. For example, where the processing units are of size 64×64 and a 3 pixel extension is used, the buffer has a fixed size of 67×67.

At 804, pre-filtered pixel values for a $N^{th}$ processing unit are copied from a region of the video frame to the buffer. Copying the pre-filtered pixel values for the $N^{th}$ processing unit from the region of the video frame to the buffer includes identifying the pre-filtered pixel values within the video frame based on an offset applied to a writing point of the video frame. The writing point represents a location extended beyond a boundary of the video frame. The offset specifies a distance from the writing point based on a number of processing units for which filtering has already been performed.

For example, the writing point can be identified by shifting a start point of the video frame by a number of pixels. The start point of the video frame represents a location of a first pre-filtered pixel value within the video frame according to an order for performing the filtering for the processing units. The number of pixels by which to shift the start point of the video frame is determined based on a resolution of the video frame. Shifting the start point of the video frame to the writing point includes determining an extended frame boundary of the video frame based on the resolution of the video frame. The extended boundary of the frame is defined by the number of pixels by which to shift the start point of the video frame.

The offset applied to the writing point changes for each of the processing units. This is because the offset for a processing unit indicates a location of a top-left-most position of the processing unit within an extended boundary of the video frame. For example, the offset for a first processing unit is zero such that the top-left-most position of the first processing unit is located at the writing point, whereas the offset for a second processing unit is based on a size of the first processing unit along at least one axis such that the top-left-most position of the second processing unit is located one pixel position over from a top-right-most pixel position of the first processing unit.

At 806, filtering is performed against the buffered pre-filtered pixel values for the $N^{th}$ processing unit. Performing the filtering against the buffered pre-filtered pixel values includes filtering those buffered pre-filtered pixel values using a filtering tool available to the encoder or decoder that is performing the technique 800. In some implementations, the filtering may be performed using a loop restoration tool of a video decoder, such as where the pre-filtered pixel values from respective regions of the video frame are pixel values output from a CDEF filter tool of the video decoder. In some implementations, the filtering may be performed using a CDEF tool of a video decoder, such as where the pre-filtered pixel values from respective regions of the video frame are pixel values output from a deblocking filter tool of the video decoder.

At 808, the filtered pixel values for the $N^{th}$ processing unit are written from the buffer to the video frame. The filtered pixel values are written to the video frame at a location based on the writing point and based on the offset applied to the writing point for $N^{th}$ processing unit. Writing the filtered pixel values for the $N^{th}$ processing unit to the video frame includes shifting a location of a first pixel of the region from the video frame for the processing unit based on a difference between the start point and the writing point. The first pixel of the region from the video frame for the processing unit is indicated by the offset.

At 810, a determination is made as to whether the $N^{th}$ processing unit is the last processing unit. At 812, responsive to a determination that the $N^{th}$ processing unit is not the last processing unit, the value of N is increased by one. The technique 800 then returns to 804, where the pre-filtered pixel values for the new $N^{th}$ processing unit are copied to the buffer. The operations performed at 804 through 810 repeat until a then-current $N^{th}$ processing unit is the last processing unit. At 814, responsive to a determination that the $N^{th}$ processing unit is the last processing unit, the video frame is output for display or storage.

In some implementations, the technique 800 may include clearing the buffer. In some implementations, the buffer may be cleared after writing the filtered pixel values for the $N^{th}$ processing unit to the video frame and before copying the pre-filtered pixel values for the next $N^{th}$ processing unit to the buffer. Clearing the buffer may, for example, include deleting the video data stored in the buffer to free up space for a next set of video data. In some implementations, clearing the buffer may include enabling a next set of video data to overwrite the video data then-currently stored in the buffer.

In some implementations, the filtered pixel values are written to a frame buffer, such as a reference frame buffer, instead of to the video frame. For example, the video frame may simply be the source of the pre-filtered pixel values and may not be written to. Instead, the filtered pixel values may be written directly to a reference frame buffer or other frame buffer. In such an implementation, outputting the video frame for display or storage may simply include verifying that filtered pixel values for a last processing unit have been written to the reference frame buffer or other frame buffer.

In some implementations, the technique 800 may include changing a head pointer of a frame buffer from the start point of the video frame to the writing point. For example, the frame buffer may be a reference frame buffer used to store reference frames for encoding or decoding further video frames. The head pointer of the frame buffer by default may point to the start point of the video frame, as the start point indicates the location of the first pixel of the video frame before filtering is performed. However, because the filtered regions of the video frame are shifted by the filtering based on the writing point, the head pointer of the frame buffer is changed for the video frame to indicate that the first pixel is located at the writing point, and not at the start point.

Referring next to FIG. 9, the technique 900 for copying and writing pixel values based on a writing point for a video frame is shown. At 902, a writing point is identified for the video frame. Identifying the writing point includes determining an extended frame boundary. The extended frame boundary may be determined based on an alignment for the video frame, such as based on a resolution for the video frame. The writing point represents a location of a first extended pixel value of the extended frame boundary.

At 904, values for a first processing unit are copied to a buffer based on the writing point. The values for the first processing unit are pre-filtered pixel values from a first region of the video frame starting at a start point of the video frame, which may, for example, be the top-left-most pixel position of the video frame. The buffer is a buffer having a fixed size for storing an extended region of the processing units of the video frame.

At 906, filtering is performed against the buffered values for the first processing unit. The filtering may include using one or more filtering tools available to the encoder or the decoder performing the technique 900. For example, the filtering can include using a loop restoration tool or a CDEF tool to change one or more of the pre-filtered pixel values stored in the buffer.

At 908, the filtered values for the first processing unit are written to the video frame. The filtered values for the first processing unit are written to the video frame at the writing point.

At 910, values for a second processing unit are copied to a buffer based on an offset applied to the writing point. the values for the second processing unit are pre-filtered pixel values from a second region of the video frame. The second region of the video frame is identified based on the offset applied to the writing point.

At 912, filtering is performed against the buffered values for the second processing unit. The filtering of the values for the second processing unit is performed using the same filtering tool as was used to previously filter the values for the first processing unit.

At 914, the filtered values for the second processing unit are written to the video frame. The filtered values for the second processing unit are written to the video frame at a location defined based on the offset for the second processing unit.

At 916, the video frame is output for display or storage. In some implementations, the video frame may be output for display within an output video stream. In some implementations, the video frame may be output for storage, such as in a reference frame buffer.

In some implementations, the technique 900 may include clearing the buffer. In some implementations, the buffer may be cleared after writing the filtered pixel values for the first processing unit to the video frame and before copying the pre-filtered pixel values for the second processing unit to the buffer. Clearing the buffer may, for example, include deleting the video data stored in the buffer to free up space for a next set of video data. In some implementations, clearing the buffer may include enabling a next set of video data to overwrite the video data then-currently stored in the buffer.

In some implementations, the filtered pixel values are written to a frame buffer, such as a reference frame buffer, instead of to the video frame. For example, the video frame may simply be the source of the pre-filtered pixel values and may not be written to. Instead, the filtered pixel values may be written directly to a reference frame buffer or other frame buffer. In such an implementation, outputting the video frame for display or storage may simply include verifying that filtered pixel values for a last processing unit have been written to the reference frame buffer or other frame buffer.

In some implementations, the technique 900 may include changing a head pointer of a frame buffer from the start point of the video frame to the writing point. For example, the frame buffer may be a reference frame buffer used to store reference frames for encoding or decoding further video frames. The head pointer of the frame buffer by default may point to the start point of the video frame, as the start point indicates the location of the first pixel of the video frame before filtering is performed. However, because the filtered regions of the video frame are shifted by the filtering based on the writing point, the head pointer of the frame buffer is changed for the video frame to indicate that the first pixel is located at the writing point, and not at the start point.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for filtering a video frame, the method comprising:
   allocating a buffer having a fixed size based on a size of processing units to use for filtering the video frame, wherein the fixed size of the buffer is configured for storing information associated with one of the processing units at a time;
   sequentially, for each of the processing units:
      copying pre-filtered pixel values from a respective region of the video frame to the buffer, wherein the respective region of the video frame is selected based on an offset applied to a writing point for the video frame, wherein the writing point represents a location extended beyond a boundary of the video frame, wherein the offset specifies a two-dimensional distance from the writing point based on a size of the processing units and a number of processing units for which filtering has already been performed, wherein the offset is different for each of the processing units;
      performing filtering against the pre-filtered pixel values within the buffer to produce filtered pixel values; and
      writing, from the buffer, the filtered pixel values to the video frame at the respective region of the video frame to replace the pre-filtered pixel values within the respective region of the video frame; and
   after the filtered pixel values are written to the video frame for each of the processing units, outputting the video frame for display or storage.

2. The method of claim 1, further comprising:
identifying the writing point by shifting a start point of the video frame by a number of pixels, wherein the start point of the video frame represents a location of a first pre-filtered pixel value within the video frame according to an order for performing the filtering for the processing units, wherein the number of pixels by which to shift the start point of the video frame is determined based on a resolution of the video frame.

3. The method of claim 2, wherein the offset for a processing unit indicates a location of a top-left-most position of the processing unit within an extended frame boundary of the video frame.

4. The method of claim 3, wherein the offset for a first processing unit is zero such that the top-left-most position of the first processing unit is located at the writing point, wherein the offset for a second processing unit is based on a size of the first processing unit along at least one axis such that the top-left-most position of the second processing unit is located one pixel position over from a top-right-most pixel position of the first processing unit.

5. The method of claim 3, wherein the extended frame boundary of the video frame is defined by the number of pixels by which to shift the start point of the video frame.

6. The method of claim 1, wherein the video frame is stored in a frame buffer, wherein the buffer and the frame buffer are different, wherein writing the filtered pixel values of a processing unit to the video frame based on the writing point and based on the offset comprises:
writing the filtered pixel values of the processing unit to the frame buffer.

7. The method of claim 1, wherein the filtering is performed using a loop restoration tool of a video decoder, wherein the pre-filtered pixel values from respective regions of the video frame are pixel values output from a constrained directional enhancement filter tool of the video decoder.

8. The method of claim 1, wherein the writing point is used for filtering subsequent video frames from a video sequence that includes the outputted video frame.

9. An apparatus for filtering a video frame, the apparatus comprising:
a memory, wherein a first portion of the memory is allocated for storing instructions, wherein a second portion of the memory is allocated for a buffer having a fixed size based on a size of processing units to use for filtering the video frame, wherein the fixed size of the buffer is configured for storing information associated with one of the processing units at a time; and
a processor configured to execute the instructions to:
copy, for a first processing unit, pre-filtered pixel values from a first region of the video frame to the buffer, wherein a start point of the first processing unit corresponds to a writing point defined for the video frame;
perform filtering against the buffered pre-filtered pixel values of the first processing unit to produce first filtered pixel values;
write, from the buffer, the first filtered pixel values to the first region of the video frame;
copy, for a second processing unit, pre-filtered pixel values from a second region of the video frame to the buffer, wherein a start point of the second processing unit corresponds to an offset applied to the writing point;
perform filtering against the buffered pre-filtered pixel values of the second processing unit to produce second filtered pixel values;
write, from the buffer, the second filtered pixel values to the second region of the video frame; and
after writing filtered pixel values for all processing units, output the video frame for display or storage.

10. The apparatus of claim 9, wherein the offset for the second processing unit specifies a distance from the writing point based on a size of the first processing unit.

11. The apparatus of claim 9, wherein the instructions include instructions to:
identify the writing point by shifting a start point of the video frame by a number of pixels, wherein the start point of the video frame represents a location of a first pre-filtered pixel value within the video frame according to an order for performing the filtering for the processing units.

12. The apparatus of claim 11, wherein a third portion of the memory is allocated for a frame buffer, wherein the buffer and the frame buffer are different, wherein the instructions to write the first filtered pixel values to the video frame include instructions to:
change a head pointer of the frame buffer from the start point of the video frame to the writing point; and
write the first filtered pixel values to the frame buffer at the writing point.

13. The apparatus of claim 11, wherein the number of pixels by which to shift the start point of the video frame is determined based on a resolution of the video frame.

14. The apparatus of claim 9, wherein a new writing point is defined for filtering a subsequent video frame of a video sequence that includes the video frame.

15. The apparatus of claim 9, wherein the instructions include instructions to:
clear the buffer after writing the first filtered pixel values to the video frame and before copying the pre-filtered pixel values of the second processing unit to the buffer.

16. A decoder that performs operations for filtering a video frame, the operations comprising:
identifying a writing point for the video frame by shifting a start point of the video frame by a number of pixels, wherein the start point of the video frame represents a top-left-most position of the video frame;
copying, for a processing unit, pre-filtered pixel values from a region of the video frame to a buffer having a fixed size based on a size of the processing unit and configured to store information associated with one processing unit at a time, wherein a position of the writing point represents a top-left-most position of the processing unit;
performing filtering against the pre-filtered pixel values from the buffer to produce filtered pixel values of the processing unit; and
writing, from the buffer, the filtered pixel values of the processing unit to the video frame based on the writing point.

17. The decoder of claim 16, wherein the processing unit is a first processing unit, the operations further comprising:
copying, for a second processing unit, pre-filtered pixel values from a next region of the video frame to the buffer, wherein a top-left-most position of the second processing unit is based on an offset applied to the writing point;
performing filtering against the pre-filtered pixel values of the second processing unit from the buffer to produce filtered pixel values of the second processing unit; and
writing the filtered pixel values of the second processing unit to the video frame based on the writing point and based on the offset.

18. The decoder of claim 17, wherein the offset from the writing point specifies a distance from the writing point based on a size of the first processing unit.

19. The decoder of claim 16, wherein the number of pixels by which to shift the start point of the video frame is determined based on a resolution of the video frame.

20. The decoder of claim 16, wherein the video frame is stored in a frame buffer, wherein the buffer and the frame buffer are different, wherein writing the filtered pixel values of the processing unit to the video frame based on the writing point comprises:
   changing a head pointer of the frame buffer from the start point of the video frame to the writing point; and
   writing the filtered pixel values of the processing unit to the frame buffer at the writing point.

* * * * *